United States Patent
Jolfaei et al.

(10) Patent No.: US 9,672,494 B2
(45) Date of Patent: Jun. 6, 2017

(54) LIGHT-WEIGHT LIFECYCLE MANAGEMENT OF ENQUEUE LOCKS

(71) Applicants: Masoud Aghadavoodi Jolfaei, Wiesloch (DE); Edgar Lott, Nussloch (DE); Achim Braemer, Heidelberg (DE)

(72) Inventors: Masoud Aghadavoodi Jolfaei, Wiesloch (DE); Edgar Lott, Nussloch (DE); Achim Braemer, Heidelberg (DE)

(73) Assignee: SAP SE, Walldorf (DE)

( * ) Notice: Subject to any disclaimer, the term of this patent is extended or adjusted under 35 U.S.C. 154(b) by 229 days.

(21) Appl. No.: 14/553,050

(22) Filed: Nov. 25, 2014

(65) Prior Publication Data

US 2016/0147560 A1    May 26, 2016

(51) Int. Cl.
*G06Q 10/10* (2012.01)
*H04L 29/08* (2006.01)
(Continued)

(52) U.S. Cl.
CPC .............. *G06Q 10/10* (2013.01); *G06F 9/466* (2013.01); *G06F 9/526* (2013.01);
(Continued)

(58) Field of Classification Search
CPC ........ G06Q 10/10; G06Q 10/06; G06F 9/526; G06F 17/30362; G06F 9/466;
(Continued)

(56) References Cited

U.S. PATENT DOCUMENTS

| 6,708,195 B1* | 3/2004 | Borman | G06F 9/52 |
| | | | 707/999.008 |
| 7,502,835 B1* | 3/2009 | Cheng | H04L 63/08 |
| | | | 709/217 |

(Continued)

FOREIGN PATENT DOCUMENTS

EP          2469410 A2      6/2012

OTHER PUBLICATIONS

"European Application Serial No. 15001808.3, Office Action mailed Oct. 19, 2015", 7 pgs.

(Continued)

*Primary Examiner* — Benjamin Wu
(74) *Attorney, Agent, or Firm* — Schwegman Lundberg & Woessner, P.A.

(57) ABSTRACT

In an example embodiment, a request for an enqueue lock for a first piece of data is received from a client application. At an enqueue server separate from an application server instance, a light-weight enqueue session is then created, including generating a light-weight enqueue session identification for the light-weight enqueue session. An enqueue lock for the first piece of data is stored in the light-weight enqueue session. The light-weight enqueue session identification is then sent to the client application. In response to a detection that a session between the client application and the application server instance has been terminated, all enqueue locks in the light-weight enqueue session are deleted and the light-weight enqueue session is deleted.

20 Claims, 10 Drawing Sheets

(51) Int. Cl.
*H04L 29/06* (2006.01)
*G06F 9/46* (2006.01)
*G06Q 10/06* (2012.01)
*G06F 17/30* (2006.01)
*G06F 9/52* (2006.01)

(52) U.S. Cl.
CPC ....... *G06F 17/30362* (2013.01); *G06Q 10/06* (2013.01); *H04L 65/1069* (2013.01); *H04L 67/02* (2013.01); *H04L 67/14* (2013.01); *H04L 67/142* (2013.01); *H04L 67/146* (2013.01)

(58) Field of Classification Search
CPC . H04L 67/146; H04L 67/142; H04L 65/1069; H04L 67/14; H04L 67/02
See application file for complete search history.

(56) References Cited

U.S. PATENT DOCUMENTS

| | | | | |
|---|---|---|---|---|
| 7,747,591 | B2* | 6/2010 | Chatterjee | G06F 9/466 707/694 |
| 8,200,834 | B2* | 6/2012 | Williams | H04L 63/08 709/224 |
| 8,572,268 | B2* | 10/2013 | Wray | H04L 63/102 709/227 |
| 8,751,469 | B2* | 6/2014 | Dittrich | G06F 9/505 707/704 |
| 8,930,550 | B2* | 1/2015 | Sheehan | G06F 21/629 709/225 |
| 9,171,019 | B1* | 10/2015 | Donlan | G06F 17/30362 |
| 9,509,776 | B2* | 11/2016 | Chou | H04L 67/14 |
| 9,578,111 | B2* | 2/2017 | Kasivajjula | H04L 67/146 |
| 9,602,424 | B1* | 3/2017 | Vincent | H04L 47/70 |
| 2003/0182285 | A1* | 9/2003 | Kuwata | G06F 17/3089 |
| 2005/0256931 | A1 | 11/2005 | Follmeg | |
| 2006/0277596 | A1* | 12/2006 | Calvert | H04L 63/0218 726/3 |
| 2007/0162449 | A1 | 7/2007 | Manolov | |
| 2015/0088978 | A1* | 3/2015 | Motukuru | H04L 67/02 709/203 |
| 2015/0280959 | A1* | 10/2015 | Vincent | H04L 67/1097 709/203 |
| 2015/0379293 | A1* | 12/2015 | Wang | G06F 21/6218 726/7 |

OTHER PUBLICATIONS

Burrows, Mike, "The Chubby lock service for loosely-coupled distributed systems", 7th Symposium on Operating Systems Design and Implementation, (Nov. 6, 2006), 335-350.

* cited by examiner

LIGHT-WEIGHT LIFECYCLE MANAGEMENT OF ENQUEUE LOCKS

TECHNICAL FIELD

This document generally relates to systems and methods for use with enqueue locks. More specifically this document relates to light-weight lifecycle management of enqueue locks.

BACKGROUND

Modern business applications often follow the stateless paradigm, which provides better scalability by eliminating heavy-weight application states being stored on an application server. The stateless paradigm treats each request as an independent transaction that is unrelated to any previous request; thus the server need not store any state information. However, some business applications have business requirements for holding exclusive locks on business entities across multiple interaction steps. In addition, there is a requirement for such locks to be interoperable between stateless web applications and old stateful web applications.

Advanced Business Application Programming (ABAP) is a high-level programming language often used to create and manage business applications. The locking of business entities in ABAP is handled in a way that ties them to an ABAP session. What is needed is a mechanism that allows for locks of business entities to be handled in a stateless manner.

DESCRIPTION OF DRAWINGS

The present disclosure is illustrated by way of example and not limitation in the figures of the accompanying drawings, in which like reference numbers indicate similar elements and in which.

DETAILED DESCRIPTION

Figure 1:
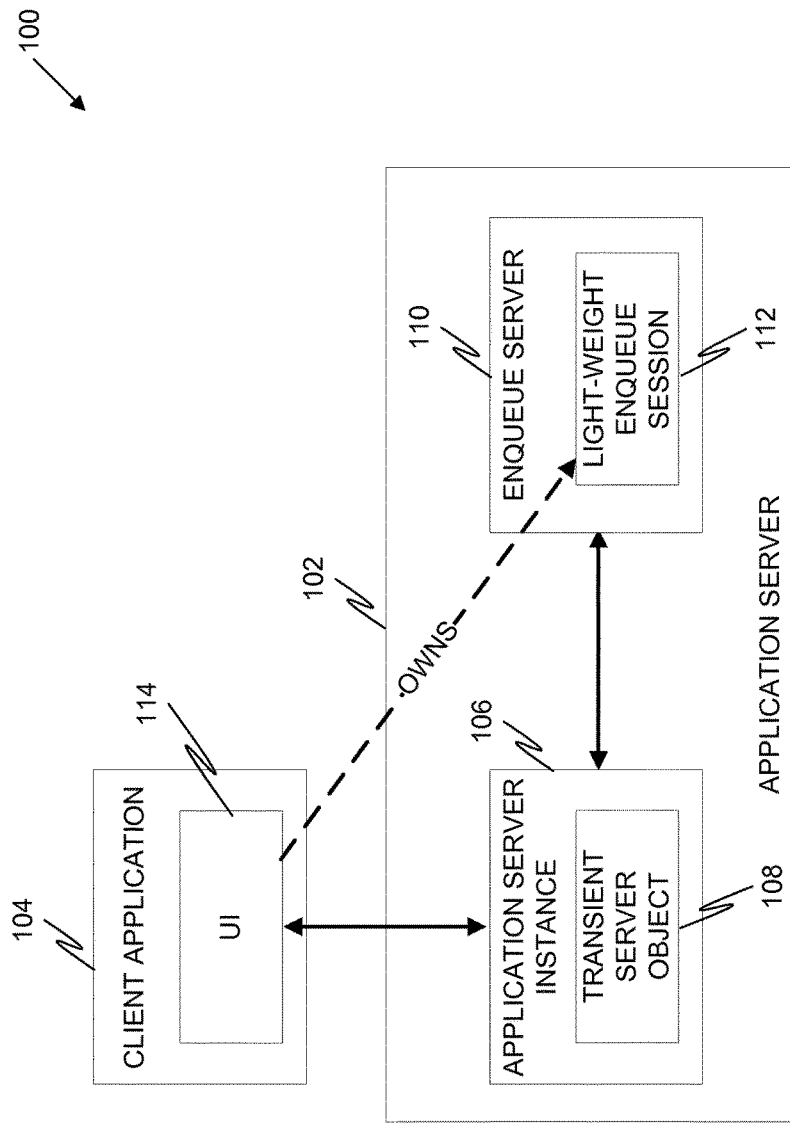
FIG. 1 is a block diagram illustrating a system, in accordance with an example embodiment, for light-weight lifecycle management of enqueue locks.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, a light-weight session concept is utilized to manage enqueue locks between interaction steps without the need for a heavy-weight session object to be stored on the application server. This enables stateless applications to hold enqueue locks across interaction steps. The lifecycle of enqueue locks for stateless applications can be controlled with, for example, a WebSocket connection, a timeout mechanism, or a combination of both. Lightweight enqueue sessions may be managed in an enqueue server itself and thus can be provided for both the ABAP application server and, for example, an in-memory database management system, such as High-Performance Analytic Appliance (HANA). Integration with an in-memory database management system will be described in more detail below.

An ABAP or other application server may implement a transaction and locking concept in the application server, decoupled from database transactions and locks. In such a system, transactions may be implemented as a "logical unit of work" (LUW) in the "taskhandler" or similar component of a server. Locks may be managed by an enqueue server. In ABAP, there may be only a single enqueue server that receives lock requests for ABAP programs, checks them for collisions with existing stored locks, and grants or rejects the lock request based on this check.

Enqueue locks may be owned by an ABAP session that associates the lock with an LUW. A taskhandler session, however, is a heavy-weight object in the application server that contains the entire ABAP program and memory state between subsequent requests from the client, such as a web browser. A session state can amount to 100 MB of memory, depending on the application. Thus, this enqueue locking mechanism is based on a stateful programming model, where the application state is held on the server between requests.

The lifecycle of enqueue locks in such a system depends on the lifecycle of the ABAP session. When the session is terminated, all locks that belong to the session are removed. An ABAP session can be terminated for a number of reasons, such as the user logging out, the client program being terminated, the connection between the client program and the server being interrupted, the client program not sending any request for the session for a time period that is longer than the configured time-out, or a fatal program error occurring.

Enqueue locks may have different flavors. Exclusive locks are owned by one user session and prevent other user sessions from writing the locked data. Other sessions requesting to acquire any lock on data which is exclusively locked are rejected. On the other hand, optimistic locks are used not to prevent other sessions from accessing some data, but to detect when some other session alters the data. Many sessions can obtain an optimistic lock on some data. When one session acquires an exclusive lock on the data, all optimistic locks are revoked. The owners of the optimistic locks can detect this afterwards and know that the data has possibly been altered. Therefore, optimistic locks are really a misnomer because they do not lock anything but rather detect the locking activities of others.

Enqueue locks may be cooperative in nature. This means a program adheres to a contract to check the lock state of data before changing it. The lock key may also not necessarily be directly determined by the data.

As described earlier, many modern applications follow a stateless programming model, meaning that the application holds little or no information about a user session. Despite the implications of the term "stateless", the server can hold some little information about current user sessions, such as login information. Additionally, the client application can hold state information about the ongoing user interaction. The stateless programming model is especially beneficial for applications that have to scale for many new users because it consumes few resources per user on the application server.

Locks are a type of concurrency control. Not all locks have to reside on the application server or database tier. For example, optimistic locks can be implemented entirely in the front end by storing some kind of identifying key of the data in question. Before the data is accessed later, the key can be compared to the current value. By such a mechanism, changes can be detected.

Additionally, exclusive locking can be applied to the stateless programming model. When a program wants to modify data on a database, it can lock the data by using, for example, "SELECT FOR UPDATE" statements, which guarantee that no other program can access the data during the time of the database transaction. Database transactions usually live only a short time, not longer than the time it takes for a single request to be processed.

Unlike optimistic locks, however, exclusive locks should reside on the application server or database tier, because other sessions are affected.

Stateless applications generally cannot lock data exclusively longer than the duration of a single request. The higher an exclusive lock exists and the more users working concurrently on the system, the higher the probability of collisions. Therefore, long-lived exclusive locks would limit the scalability of the application.

On the other hand, some applications require locks from a business perspective and to fulfill user expectations. When, for example, a book in stock is accidentally sold to two persons but only one person receives confirmation of the sale, that may be acceptable. However, if both persons pay for the book, the one who doesn't receive confirmation may complain. If this is expanded to more expensive business items, such as a million dollar piece of machinery, it becomes clear that exclusive locking is needed for some operations. In complex business applications, it may also be beneficial to have exclusive locks span the multiple steps of a workflow, and therefore kept alive on the application server or in the database between requests.

In an example embodiment, a new type of session is created. This session is very light-weight in order not to counteract the purpose of stateless applications, namely to save resources on the server. Rather than utilize, for example, a full-fledged ABAP or similar session, a light-weight enqueue session is utilized to handle enqueue locks belonging to a user session. The enqueue sessions will not live on the application server, but rather live on an enqueue server separate from the running instance of the application server. Since the sessions do not live on the application server, the client application stores the key of the session and brings it together with every request that wants to access the locks contained in the session.

FIG. 1 is a block diagram illustrating a system 100, in accordance with an example embodiment, for light-weight lifecycle management of enqueue locks. The system 100 includes an application server 102 and a client application 104. The application server 102 contains an application server instance 106. The application server instance 106 contains no session state, but does contain a transient server object 108 storing transient data used to process a request. The application server 102 also contains a separate enqueue server 110 that manages a light-weight enqueue session 112. The client application 104 runs a user interface (UI) session 114 that sends requests to the application server 102, and specifically to the application server instance 106 in the application server 102. In an example embodiment, the UI session 114 does not communicate directly with the enqueue server 110. Rather the application server instance 106 communicates with the enqueue server 110 to create a lock object in the light-weight enqueue session 112, when appropriate.

It should be noted that under some definitions of the term "stateless," implementations that hold locks on the application server cannot be called "stateless" any more because of the information stored on the application server. However, for purposes of this document, it is assumed that the term "stateless" can include implementations that are truly absolutely stateless as well as implementations that include a minor amount of information on the application server, such as in this case.

In an example embodiment, each light-weight enqueue session 112 is a common attribute shared by a set of enqueue locks that allows them to be managed together. Since the light-weight enqueue session 112 does not live on the application server instance 106, the UI session 114 may store the key for the session and bring the key together with every request to access the locks contained in the session.

Figure 2:
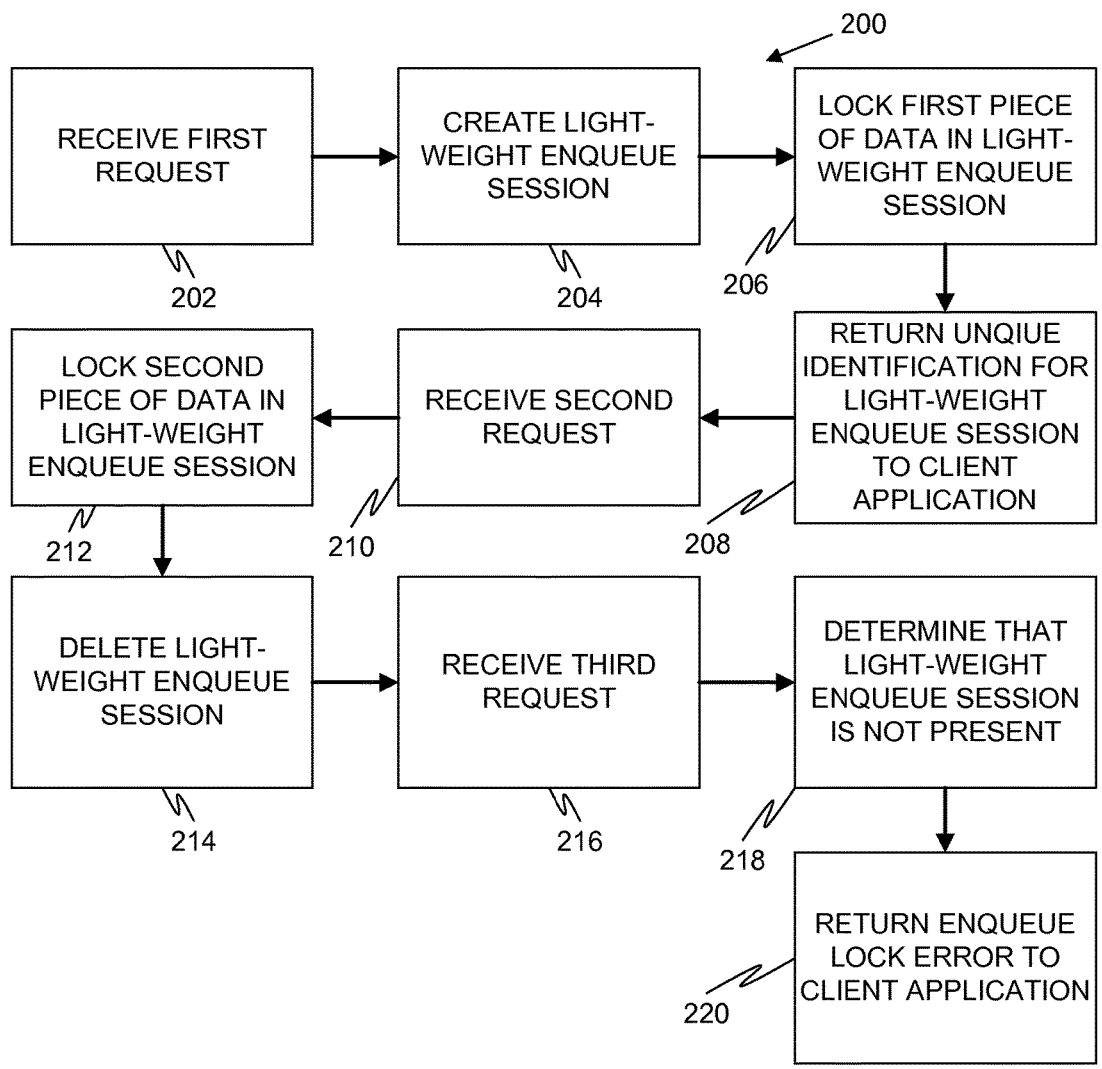
FIG. 2 is a flow diagram illustrating a method, in accordance with an example embodiment, of managing light-weight enqueue sessions.

FIG. 2 is a flow diagram illustrating a method 200, in accordance with an example embodiment, of managing light-weight enqueue sessions. In an example embodiment the method 200 is performed by an enqueue server. At operation 202, a first request is received, the first request requesting an enqueue lock for a first piece of data. It should be noted that a "piece of data" as used in this document shall be interpreted to mean any amount of data to which a lock is attempting to be applied, from the smallest piece of data such as a field in a record to the largest, such as an entire business entity.

In an example embodiment this request is received from an application server instance (e.g., application server instance 106) but originates in a client application (e.g., client application 104). At operation 204, in response to receiving the first request, a light-weight enqueue session is created on the enqueue server. This may include, for example, determining a unique identification for the light-weight enqueue session and storing that unique identification in a data structure created for the light-weight enqueue session on the enqueue server. At operation 206, the first piece of data is locked by adding an enqueue lock for the first piece of data in the light-weight enqueue session. At operation 208, the unique identification for the light-weight enqueue session is returned to the client application. In an example embodiment, the unique identification is communicated indirectly to the client application via the application server instance.

At operation 210, a second request is received. This second request may also request an enqueue lock but may be for a second piece of data and include the unique identification for the light-weight enqueue session that was previously returned to the client application. At operation 212, the second piece of data is locked by adding an enqueue lock for the second piece of data in the light-weight enqueue session.

At operation 214, the light-weight enqueue session may be deleted using lifecycle management. At operation 216, a third request is received. This may request an enqueue lock for a third piece of data and include the unique identification for the light-weight enqueue session that was previously returned to the client application. At operation 218, it is determined that the light-weight enqueue session corresponding to the unique identification is not present. In response to this determination, at operation 220 an enqueue lock error is returned to the client application (via the application server). The client application is then made aware that the data in question is not locked anymore and may try to lock it again or react in any way that seems appropriate.

In an example embodiment, lifecycle management operates not on individual locks but on a light-weight enqueue session as a whole. This means that locks are not cleaned up individually, but all locks in a session are cleaned up at once. Otherwise, the lock state could become inconsistent since enqueue locks may depend on one another.

Since the light-weight enqueue sessions reside on the enqueue server and not on individual application server instances, they can be accessed system-wide from any application server. There is no need for session stickiness to use light-weight enqueue locks.

There are a variety of ways for light-weight enqueue sessions to be managed. In one example embodiment, WebSocket-based lifecycle management is used. WebSocket connections are persistent Transmission Control Protocol (TCP) or similar protocol connections between client applications, such as web browsers, and application servers that can be used for full-duplex communications. WebSocket connections are typically opened by a JavaScript or similar function in a client application. The connection setup works in a similar way as HyperText Transfer Protocol (HTTP) requests, but after the initial handshake, the connection remains open and both sides can send messages to the other. In addition to an application payload, both the client application and the application server can send regular keep-alive packets to ensure the other side is still alive. A WebSocket connection can terminate for a number of reasons, including that the JavaScript closes the connection, the user navigates away from the page, the client application is closed or crashes, the client application is disconnected from the network, or the entire computer system operating the client application crashes. In the latter two cases, the failure is detected only when requests are sent to the client application. This is accomplished by keep-alive messages sent in regular intervals by the application server.

Figure 3:
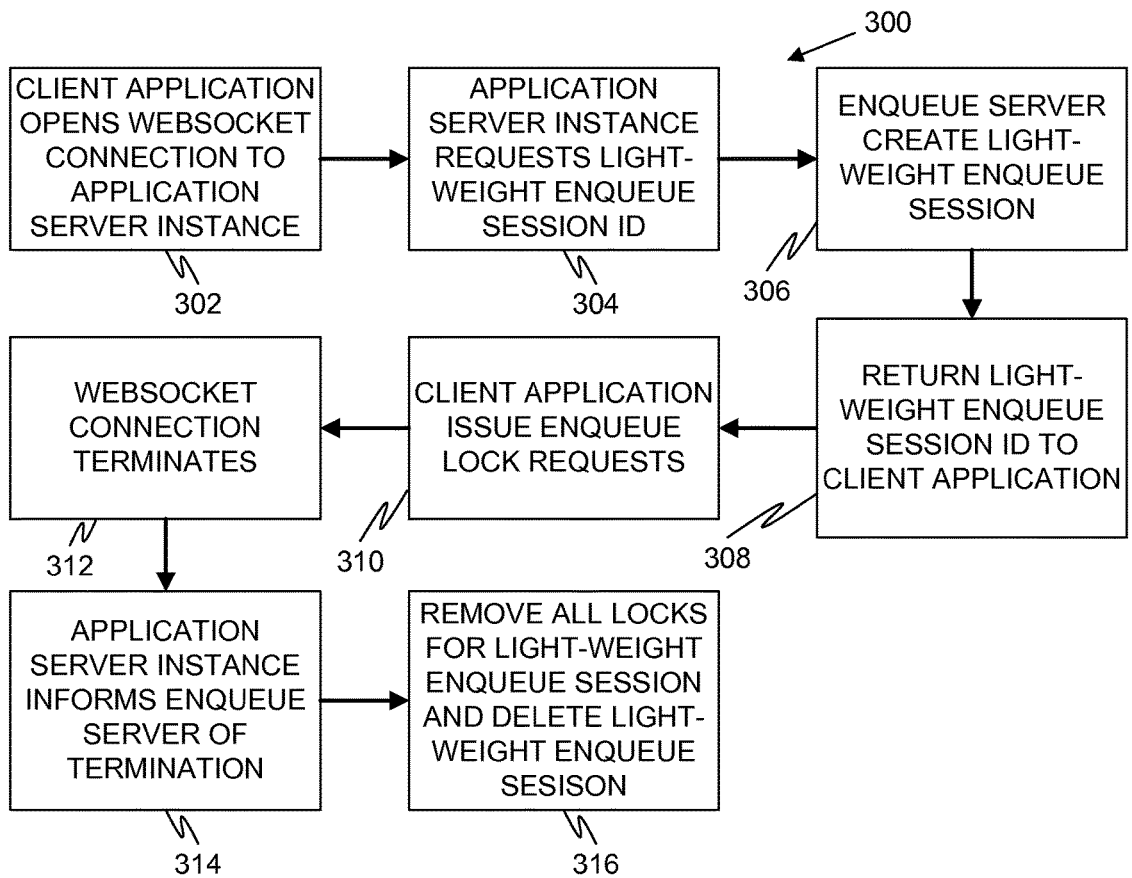
FIG. 3 is a flow diagram illustrating a method, in accordance with an example embodiment, of managing the lifecycle of a light-weight enqueue session using a WebSocket connection.

FIG. 3 is a flow diagram illustrating a method 300, in accordance with an example embodiment, of managing the lifecycle of a light-weight enqueue session using a WebSocket connection. At operation 302, the client application opens a WebSocket connection to the application server instance. At operation 304, the application server instance requests a light-weight enqueue session identification from an enqueue server. At operation 306, the enqueue server may create a light-weight enqueue session and associate a light-weight enqueue session identification with it. At operation 308, the application server instance returns the light-weight enqueue session identification to the client application. At operation 310, the client application issues enqueue lock requests to the application server instance, either across the WebSocket connection or over some other communication protocol, such as HTTP. These enqueue lock requests include the light-weight enqueue session identification which is used to associate the lock requests with the light-weight enqueue session. At operation 312, the WebSocket connection terminates. This may be due to, for example, any of the possible reasons described above. At operation 314, the application server instance informs the enqueue server that the WebSocket connection has terminated. At operation 316, the enqueue server removes all locks belonging to the light-weight enqueue session and then deletes the light-weight enqueue session itself.

Figure 4:
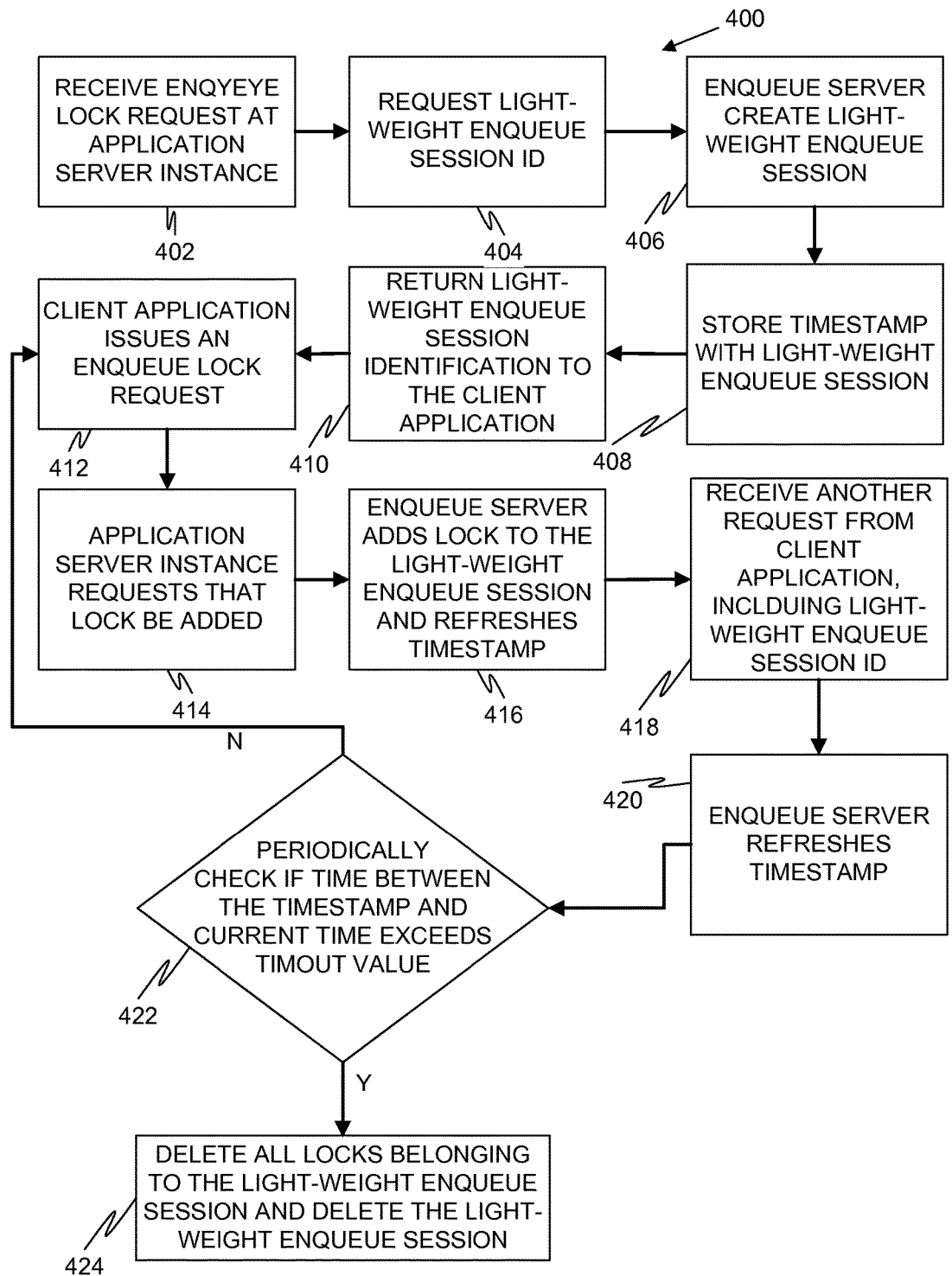
FIG. 4 is a flow diagram illustrating a method, in accordance with an example embodiment, of managing the lifecycle of a light-weight enqueue session using timeouts.

An alternative way for the lifecycle of light-weight enqueue sessions to be managed is based on timeouts. In this example embodiment, the light-weight enqueue session is not bound to any physical entity but is bound to a timestamp. FIG. 4 is a flow diagram illustrating a method 400, in accordance with an example embodiment, of managing the lifecycle of a light-weight enqueue session using timeouts. At operation 402, an enqueue lock request is received at an application server instance from a client application. At operation 404, the application server instance requests a light-weight enqueue session identification from an enqueue server. At operation 406, the enqueue server may create a light-weight enqueue session and associate a light-weight enqueue session identification with it. At operation 408, the enqueue server may store a timestamp with the light-weight enqueue session. This timestamp correlates to the time (and possibly date) when the light-weight enqueue session was created.

At operation 410, the application server instance returns the light-weight enqueue session identification to the client application. At operation 412, the client application issues an enqueue lock request to the application server instance. At operation 414, the application server instance requests that the enqueue server add a lock in accordance with the enqueue lock request. At operation 416, the enqueue server may add a lock to the light-weight enqueue session and refresh the timestamp. The refreshing of the timestamp may include, for example, deleting the previous timestamp and placing a new time stamp with the current time (and date) into the light-weight enqueue session.

At operation 418, another request is received at the application server instance from the client application. This request may or may not request another enqueue lock. It may be, for example, just a request to access data. Regardless, the other request may include the light-weight enqueue session identification. At operation 420, the enqueue server may refresh the timestamp for the light-weight enqueue session.

Thus, all subsequent requests from the client application that include the light-weight enqueue session identification, regardless of whether the requests themselves are ever passed to or affect the enqueue server, cause the enqueue server to refresh the timestamp. Periodically, the enqueue server checks all light-weight enqueue sessions for timeout. If a timestamp is older than a timeout value, such as a preset timeout value, all locks belonging to that light-weight enqueue session are deleted as well as the light-weight enqueue session itself These steps are reflected in operations 422-424. At operation 422, the enqueue server periodically checks the light-weight enqueue session to see if the time between the timestamp and the current time exceeds the timeout value. If so, then at operation 424, all locks belonging to the light-weight enqueue session are deleted and the light-weight enqueue session is deleted.

In another example embodiment, a hybrid of the WebSocket-based solution and the timeout-based solution is utilized. The WebSocket-based mechanism has the benefit of providing direct notification when the user closes the client application or navigates away from the client application. In such instances, locks can be disposed of quite quickly in order to minimize the risk of unnecessary collisions, which increases scalability. On the other hand, WebSockets can be closed inadvertently due to network conditions, which can invalidate user work progress.

The timeout-based solution, on the other hand, does not require a separate and stateful connection for managing the light-weight enqueue session, but long timeouts may have to be chosen in order to allow users enough time to complete their tasks. This can lead to residual locks after a client application crash, which frustrates users when they are locked out when trying to perform the task again. In addition, the long lifetime of such timeouts can reduce scalability.

Figure 5:
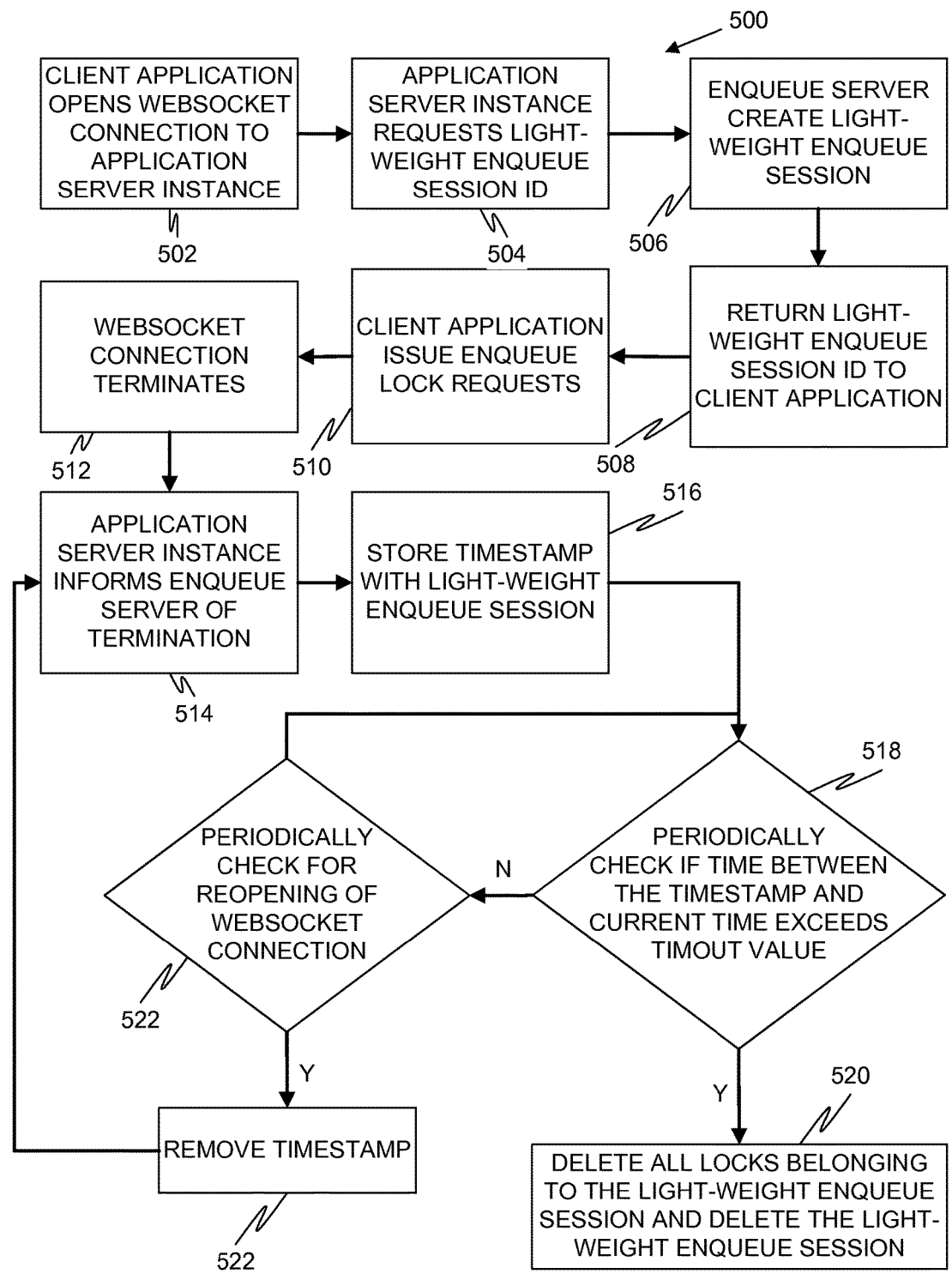
FIG. 5 is a flow diagram illustrating a method, in accordance with an example embodiment, of managing the lifecycle of a light-weight enqueue session using a hybrid of a WebSocket and timeouts.

FIG. 5 is a flow diagram illustrating a method 500, in accordance with an example embodiment, of managing the lifecycle of a light-weight enqueue session using a hybrid of a WebSocket and timeouts. At operation 502, the client application opens a WebSocket connection to the application server instance. At operation 504, the application server instance requests a light-weight enqueue session identification from an enqueue server. At operation 506, the enqueue server may create a light-weight enqueue session and associate a light-weight enqueue session identification with it. At operation 508, the application server instance returns the light-weight enqueue session identification to the client application. At operation 510, the client application issues enqueue lock requests to the application server instance, either across the WebSocket connection or over some other communication protocol, such as HTTP. These enqueue lock requests include the light-weight enqueue session identification which is used to associate the lock requests with the light-weight enqueue session. At operation 512, the WebSocket connection terminates. This may be due to, for example, any of the possible reasons described above. At operation 514, the application server instance informs the enqueue server that the WebSocket connection has terminated. At operation 516, the enqueue server adds a timestamp, such as the current time, to the light-weight enqueue session. A short timeout value may be selected or used. At operation 518, the enqueue server periodically checks the light-weight enqueue session to see if the time between the timestamp and the current time exceeds the timeout value. If so, then at operation 520 all locks belonging to the light-weight enqueue session are deleted and the light-weight enqueue session is deleted. If not, then at operation 522 it is possible that the client application can reopen the WebSocket connection and associate it to the corresponding light-weight enqueue session by presenting its light-weight enqueue session identification. Thus operation 522 checks for such an occurrence. If this occurs, then at operation 524 the enqueue server removes the timestamp. At this point, WebSocket-based lifecycle management is reestablished by returning the process to operation 514.

This hybrid scenario can present the best of both worlds. A persistent connection can be used that allows fast detection when the client application disconnects. A short timeout allows the client application to reconnect in the case of network or other temporary breakdown without losing the interaction state, which, especially in mobile device scenarios, can be important. The timeout can be short enough so that in case the user wants to continue working after a web application crash, he or she does not have to wait for too long until the locks are removed by the timeout.

In ABAP, the ABAP state keeps track of the acquired enqueue locks. When the lock is used during later interaction steps, it can rely on the locks to still exist. In the stateless programming model using a light-weight enqueue session, the client application cannot necessarily rely on locks from a former interaction step to still exist during subsequent steps. This can be handled in a variety of ways. In an example embodiment, the client application checks explicitly that locks created in previous interaction steps still exist before using them. In another example embodiment, the client application is notified by the enqueue server (via the application server instance) when starting request processing if the locks do not exist anymore. In another example embodiment, the enqueue server aborts request process and returns an error code to the client application, via the application server instance. In other example embodiments, any combination of the above are used.

It should be noted that while the above describes embodiments where the client application, or the user running the client application, is the "lock owner" for each lock, other embodiments are foreseen where the locks are tied to database entries instead of client applications, user agents, or users.

Additionally, the same or a similar mechanism as described above for managing enqueue locks independent of a stateful user session in an application server instance can be used for in-memory database management system applications, such as in HANA. New native HANA applications may embrace the stateless programming paradigm and thus may not need locking across multiple interaction steps. They therefore may have no need for enqueue locks. However, many current HANA applications operate on data that is managed by an ABAP, such as an Enterprise Resource Planning (ERP) or Customer Relationship Management (CRM) system. ABAP programs rely on enqueue locks as the primary concurrency control mechanism. In order to cooperate with an ABAP server that simultaneously operates on the same data, the HANA application should play by the same rules. Thus, in an example embodiment, a HANA application may utilize the techniques outlined above with respect to light-weight enqueue sessions.

Figure 6:
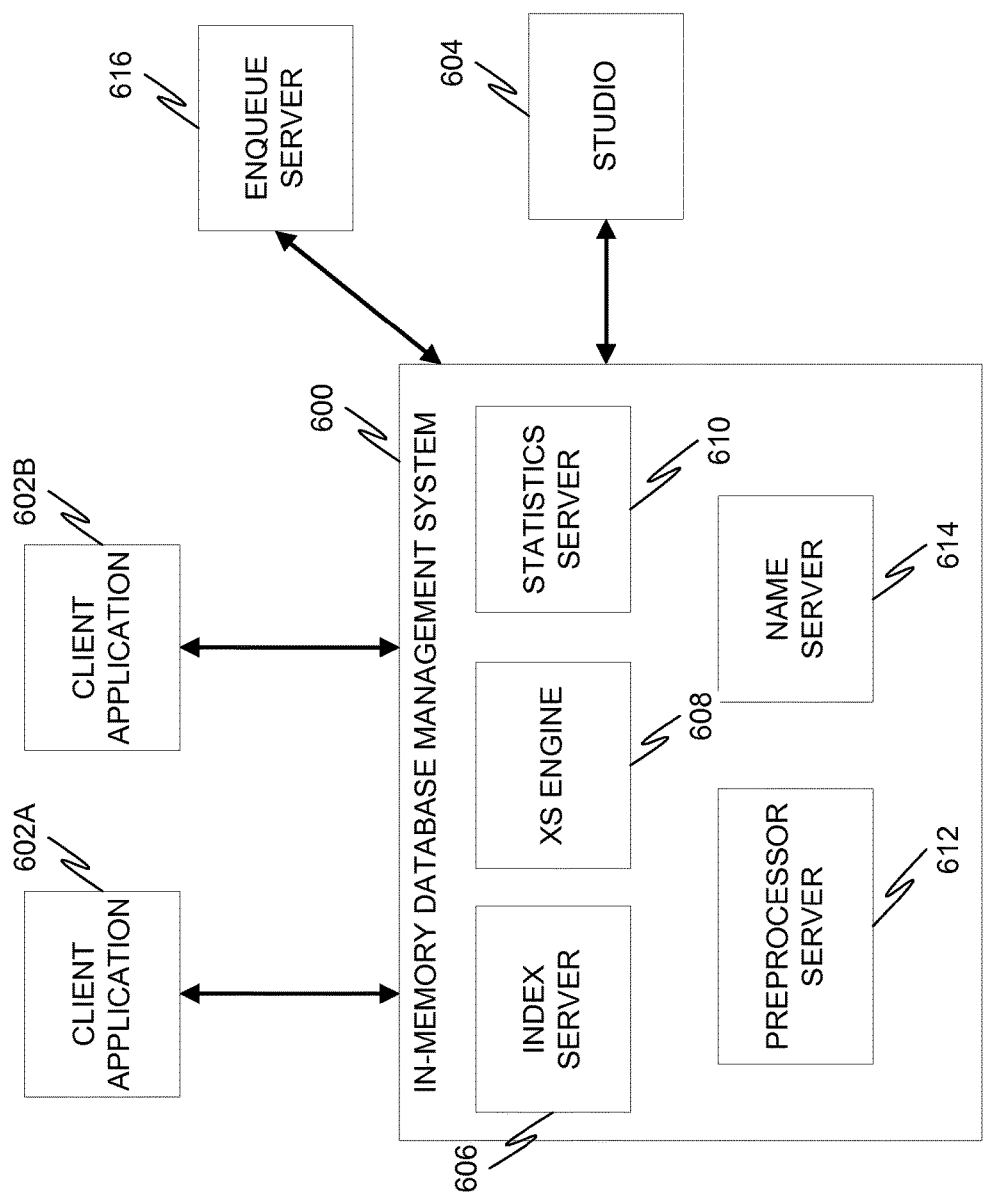
FIG. 6 is a diagram illustrating an in-memory database management system in accordance with an example embodiment.

FIG. 6 is a diagram illustrating an in-memory database management system 600 in accordance with an example embodiment. Here, the in-memory database management system 600 may be coupled to one or more client applications 602A, 602B. The client applications 602A, 602B may communicate with the in-memory database management system 600 through a number of different protocols, including Structured Query Language (SQL), Multidimensional Expressions (MDX), Hypertext Transfer Protocol (HTTP), Representational State Transfer (REST), and Hypertext Markup Language (HTML).

Also depicted is a studio 604, used to perform modeling by accessing the in-memory database management system 600. In an example embodiment, a studio 604 can allow complex analysis to be performed on data drawn not only from real time event data and windows, but also from stored database information.

The in-memory database management system 600 may comprise a number of different components, including an index server 606, an XS engine 608, a statistics server 610, a preprocessor server 612, and a name server 614. These components may operate on a single computing device, or may be spread among multiple computing devices (e.g., separate servers).

The index server 606 contains the actual data and the engines for processing the data. It also coordinates and uses all the other servers.

The XS engine 608 allows clients to connect to the in-memory database management system 600 using web protocols, such as Hypertext Transfer Protocol (HTTP).

The statistics server 610 collects information about status, performance, and resource consumption from all the other server components. The statistics server 610 can be accessed from the studio 604 to obtain the status of various alert monitors.

The preprocessor server 612 is used for analyzing text data and extracting the information on which the text search capabilities are based.

The name server 614 holds information about the database topology. This is used in a distributed system with instances of the database on different hosts. The name server 614 knows where the components are running and which data is located on which server. In an example embodiment, a separate enqueue server 616 may operate in the manner described above with respect to enqueue servers, specifically with regard to creating and managing light-weight enqueue sessions.

Figure 7:
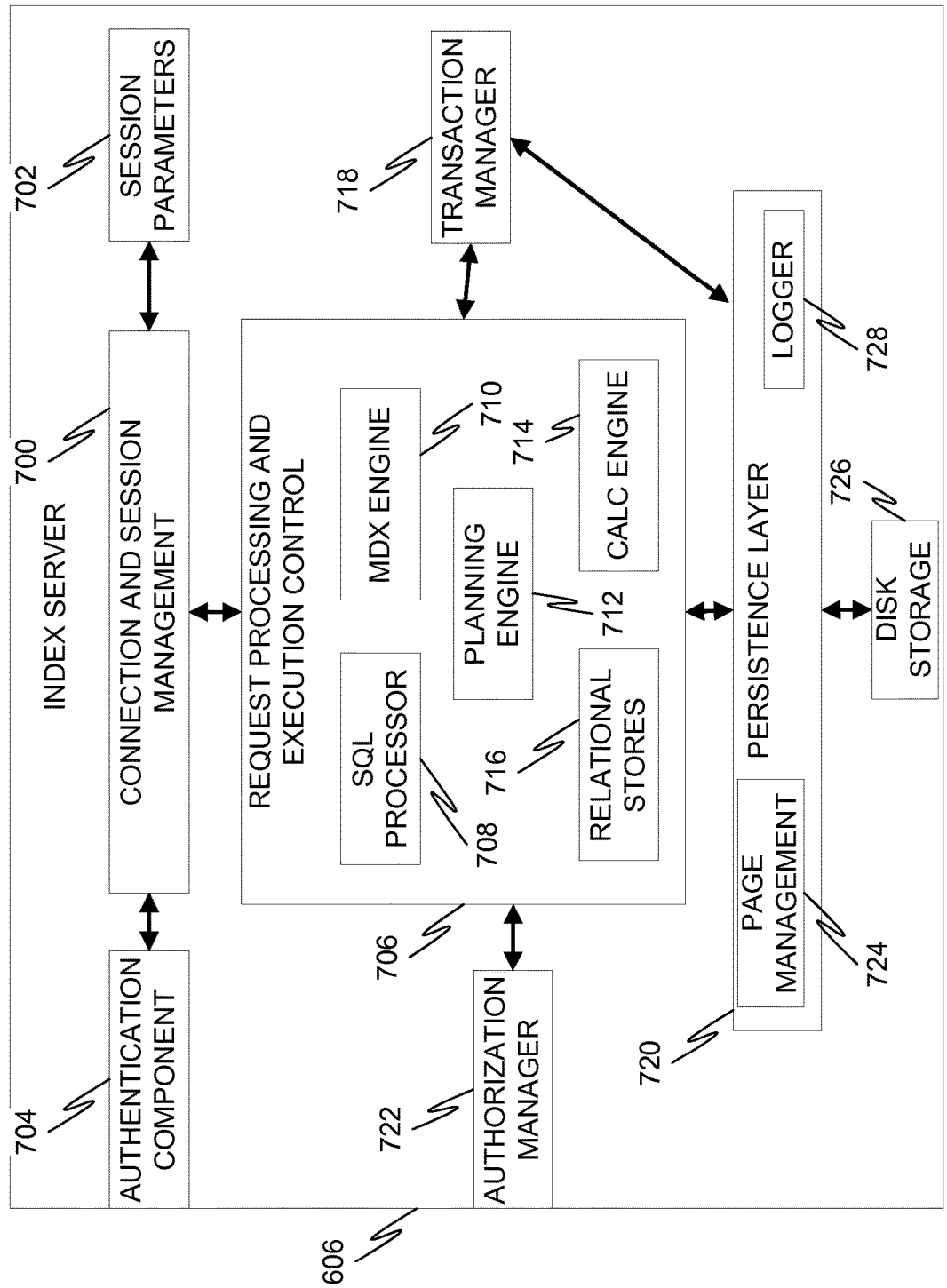
FIG. 7 is a diagram illustrating an index server in accordance with an example embodiment.

FIG. 7 is a diagram illustrating an index server 606 in accordance with an example embodiment. Specifically, the index server 606 of FIG. 6 is depicted in more detail. The index server 606 includes a connection and session management component 700, which is responsible for creating and managing sessions and connections for the database clients. Once a session is established, clients can communicate with the database system using SQL statements. For each session, a set of session parameters 702 may be maintained, such as auto-commit, current transaction isolation level, etc. Users (e.g., system administrators, developers) may be authenticated by the database system itself (e.g., by logging in with user name and password, using an authentication component 704) or authentication can be delegated to an external authentication provider such as a Lightweight Directory Access Protocol (LDAP) directory.

The client requests can be analyzed and executed by a set of components summarized as request processing and execution control 706. An SQL processor 708 checks the syntax and semantics of the client SQL statements and generates a logical execution plan. Multidimensional expressions (MDX) is a language for querying and manipulating multidimensional data stored in OLAP cubes. As such, an MDX engine 710 is provided to allow for the parsing and executing of MDX commands. A planning engine 712 allows applications (e.g., financial planning applications) to execute basic planning operations in the database layer. One such operation is to create a new version of a dataset as a copy of an existing dataset, while applying filters and transformations.

A calculation engine 714 implements the various SQL script and planning operations. The calculation engine 714 creates a logical execution plan for calculation models derived from SQL script, MDX, planning, and domain-specific models. This logical execution plan may include, for example, breaking up a model into operations that can be processed in parallel.

The data is stored in relational stores 716, which implement a relational database in main memory.

Each SQL statement may be processed in the context of a transaction. New sessions are implicitly assigned to a new transaction. A transaction manager 718 coordinates database transactions, controls transactional isolation, and keeps track of running and closed transactions. When a transaction is committed or rolled back, the transaction manager 718 informs the involved engines about this event so they can execute needed actions. The transaction manager 718 also cooperates with a persistence layer 720 to achieve atomic and durable transactions.

An authorization manager 722 is invoked by other database system components to check whether the user has the specified privileges to execute the requested operations. The database system allows for the granting of privileges to users or roles. A privilege grants the right to perform a specified operation on a specified object.

The persistence layer 720 ensures that the database is restored to the most recent committed state after a restart and that transactions are either completely executed or completely undone. To achieve this goal in an efficient way, the persistence layer 720 uses a combination of write-ahead logs, shadow paging, and save points. The persistence layer 720 also offers a page management interface 724 for writing and reading data to a separate disk storage 726, and also contains a logger 728 that manages the transaction log. Log entries can be written implicitly by the persistence layer 720 when data is written via the persistence interface or explicitly by using a log interface.

Figure 8:
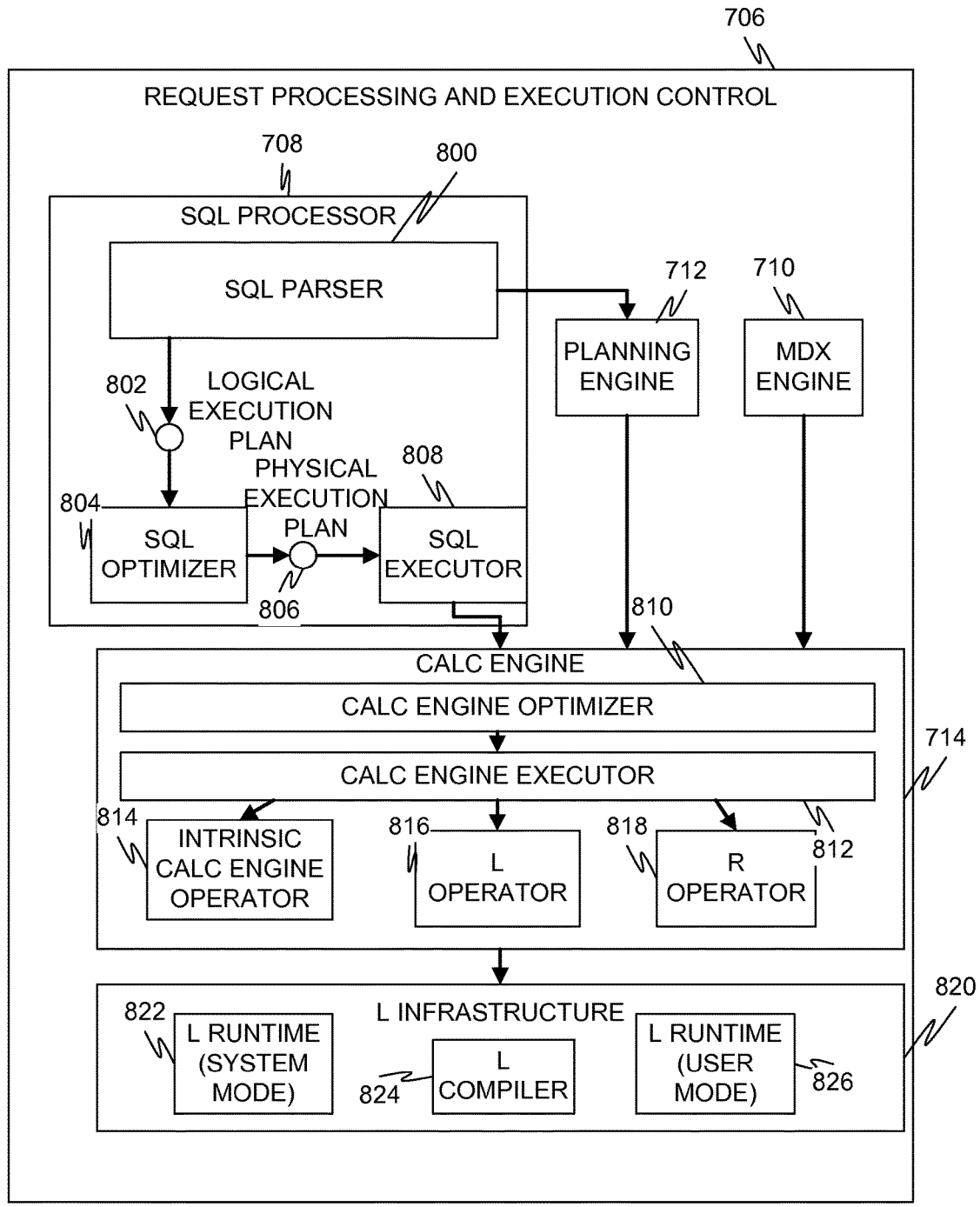
FIG. 8 is a diagram illustrating a request processing and execution control in accordance with an example embodiment.

FIG. 8 is a diagram illustrating a request processing and execution control 706 in accordance with an example embodiment. This diagram depicts the request processing and execution control 706 of FIG. 7 in more detail. The SQL processor 708 contains an SQL parser 800, which parses the SQL statement and generates a logical execution plan 802, which it passes to an SQL optimizer 804. The SQL optimizer 804 then optimizes the logical execution plan 802 and converts it to a physical execution plan 806, which it then passes to an SQL executor 808. The calculation engine 714 implements the various SQL script and planning operations, and includes a calc engine optimizer 810, which optimizes the operations, and a calc engine executor 812, which executes the operations, as well as an intrinsic calc engine operator 814, an L operator 816, and an R operator 818.

An L infrastructure 820 includes a number of components to aid in the running of L procedures, including an L-runtime (system mode) 822, an L compiler 824, and an L-runtime (User mode) 826.

Example Mobile Device

Figure 9:
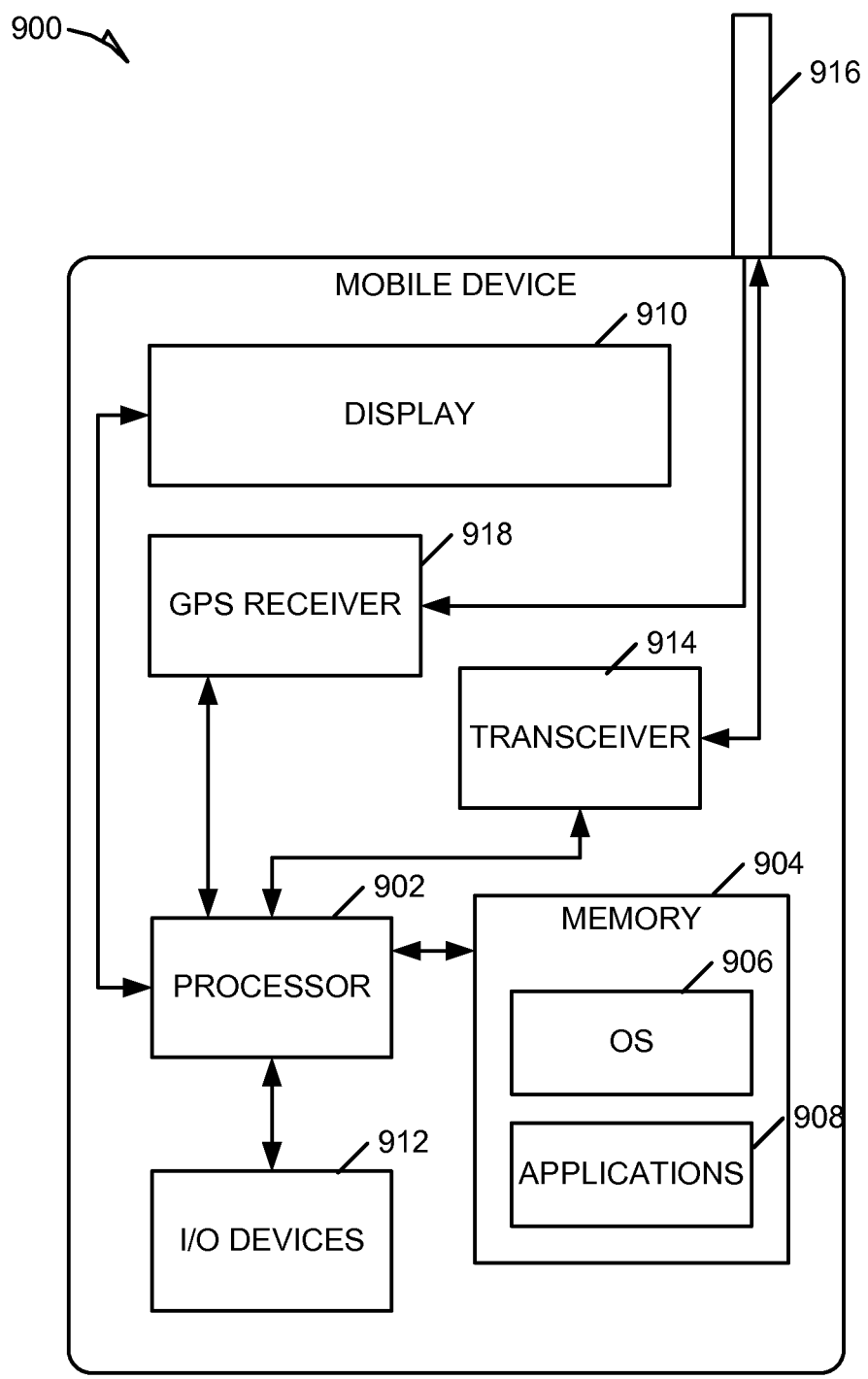
FIG. 9 is a block diagram illustrating a mobile device, according to an example embodiment.

FIG. 9 is a block diagram illustrating a mobile device 900, according to an example embodiment. The mobile device 900 can include a processor 902. The processor 902 can be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 can be adapted to store an operating system (OS) 906, as well as application programs 908. The processor 902 can be coupled, either directly or via appropriate intermediary hardware, to a display 910 and to one or more input/output (I/O) devices 912, such as a keypad, a touch panel sensor, a microphone, and the like. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors 902 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 902 or other programmable processor 902) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 902 configured using software, the general-purpose processor 902 can be configured as different hardware-implemented modules at different times. Software can accordingly configure a processor 902, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 902 that are temporarily configured (e.g., by software) or permanently configured to perform the relevant operations. Whether temporarily or permanently configured, such processors 902 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors 902 or processor-implemented modules. The performance of certain of the operations can be distributed among the one or more processors 902, not only residing within a single machine, but deployed across a number of machines. In some example embodiments, the processor 902 or processors 902 can be located in a single location (e.g., within a home environment, an office environment or a server farm), while in other embodiments the processors 902 can be distributed across a number of locations.

The one or more processors 902 can also operate to support performance of the relevant operations in a "cloud computing" environment or as a "software as a service" (SaaS). For example, at least some of the operations can be performed by a group of computers (as examples of machines including processors 902), these operations being accessible via a network (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 902, a computer, or multiple computers.

A computer program can be written in any form of programming language, including compiled or interpreted languages, and it can be deployed in any form, including as a stand alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 902 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 902), or in a combination of permanently and temporarily configured hardware can be a design choice. Below are set out hardware (e.g., machine) and software architectures that can be deployed, in various example embodiments.

Example Machine Architecture and Machine-Readable Medium

Figure 10:
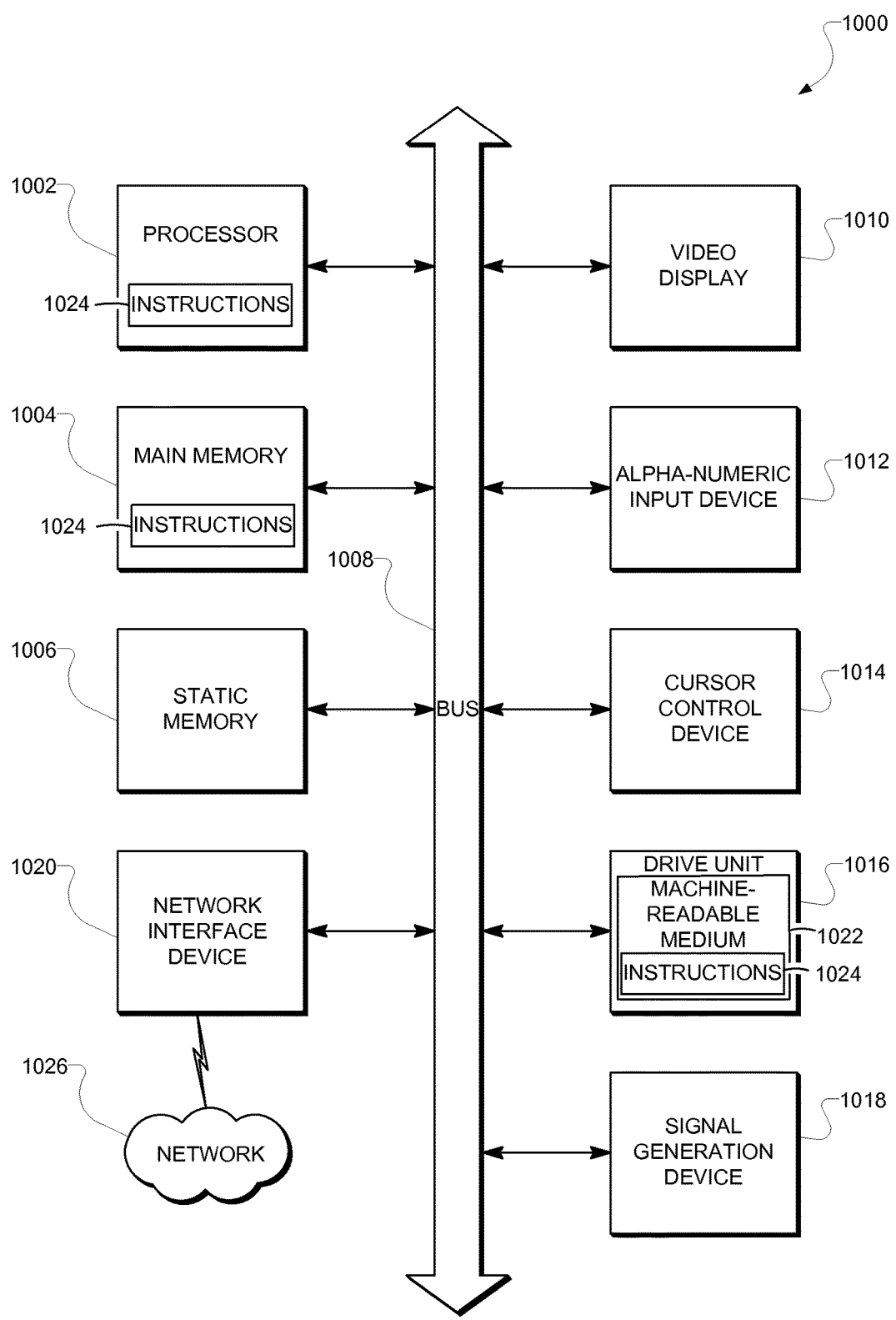
FIG. 10 is a block diagram of machine in the example form of a computer system within which instructions can be executed for causing the machine to perform any one or more of the methodologies discussed herein.

FIG. 10 is a block diagram of machine in the example form of a computer system 1000 within which instructions 1024 can be executed for causing the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a CPU, a graphics processing unit (GPU), or both), a main memory 1004 and a static memory 1006, which communicate with each other via a bus 1008. The computer system 1000 can further include a video display 1010 (e.g., a liquid crystal display (LCD) or a cathode ray tube (CRT)). The computer system 1000 also includes an alphanumeric input device 1012 (e.g., a keyboard or a touch-sensitive display screen), a cursor control device 1014 (e.g., a mouse), a drive unit 1016, a signal generation device 1018 (e.g., a speaker), and a network interface device 1020.

Machine-Readable Medium

The drive unit 1016 includes a machine-readable medium 1022 on which is stored one or more sets of instructions (e.g., software) 1024 embodying or utilized by any one or more of the methodologies or functions described herein. The instructions 1024 can also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" can include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions 1024 for execution by the machine and that cause the machine to perform any one or more of the methodologies of the present disclosure or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 can further be transmitted or received over a communications network 1026 using a transmission medium. The instructions 1024 can be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1024 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving, from a client application, a request for an enqueue lock for a first piece of data;
creating, by an enqueue server separate from an application server instance, a light-weight enqueue session at the enqueue server for managing lifecycle of enqueue locks, the creating including generating a light-weight enqueue session identification for the light-weight enqueue session;
storing, in the light-weight enqueue session, the enqueue lock for the first piece of data;
sending the light-weight enqueue session identification to the client application;
receiving, from the client application, a request for an enqueue lock for a second piece of data, the request for the enqueue lock for the second piece of data including the light-weight enqueue session identification;
storing, in the light-weight enqueue session, the enqueue lock for the second piece of data;
detecting that a session between the client application and the application server instance has been terminated; and
deleting all enqueue locks in the light-weight enqueue session and deleting the light-weight enqueue session in response to the detection that the session between the client application and the application server instance has been terminated.

2. The method of claim 1, wherein the receiving, from the client application, the request for the enqueue lock for the first piece of data comprises receiving the request for the enqueue lock for the first piece of data via the application server instance.

3. The method of claim 1, wherein the receiving, from the client application, the request for the enqueue lock for the second piece of data comprises receiving the request for the enqueue lock for the second piece of data via the application server instance.

4. The method of claim 1, wherein the sending the light-weight enqueue session identification to the client application comprises sending the light-weight enqueue session identification to the client application via the application server instance.

5. The method of claim 1, wherein the detecting that the session between the client application and the application server instance has been terminated comprises receiving notification that a WebSocket connection between the client application and the application server instance has been terminated.

6. The method of claim 1, wherein the detecting that the session between the client application and the application server instance has been terminated comprises determining that a time elapsed since a last request from the client application including the light-weight enqueue session identification was received exceeds a timeout value.

7. The method of claim 1, wherein the detecting that the session between the client application and the application server instance has been terminated comprises receiving notification that a WebSocket connection between the client application and the application server instance has been terminated and also determining that a time elapsed since the WebSocket connection has been terminated and no new WebSocket connection including the light-weight enqueue session identification has been established.

8. The method of claim 1, wherein the enqueue lock is owned by a database entry.

9. A system comprising:
an application server instance; and
an enqueue server;
the application server instance comprising one or more processors and configured to:
receive, from a client application, a request for an enqueue lock for a first piece of data;
send the request for the enqueue lock for the first piece of data to the enqueue server;
the enqueue server configured to:
create a light-weight enqueue session for managing lifecycle of enqueue locks, the creating including generating a light-weight enqueue session identification for the light-weight enqueue session;
store, in the light-weight enqueue session, the enqueue lock for the first piece of data;
send the light-weight enqueue session identification to the application server instance;
the application server instance further configured to:
send the light-weight enqueue session identification to the client application;
receive, from the client application, a request for an enqueue lock for a second piece of data, the request for the enqueue lock for the second piece of data including the light-weight enqueue session identification;
send the request for the enqueue lock for the second piece of data to the enqueue server;
the enqueue server further configured to:
store, in the light-weight enqueue session, the enqueue lock for the second piece of data;
detect that a session between the client application and the application server instance has been terminated; and
delete all enqueue locks in the light-weight enqueue session and delete the light-weight enqueue session in response to the detection that the session between the client application and the application server instance has been terminated.

10. The system of claim 9, wherein the application server instance is an index server in an in-memory database management system.

11. The system of claim 9, wherein the detecting that the session between the client application and the application server instance has been terminated comprises receiving notification that a WebSocket connection between the client application and the application server instance has been terminated.

12. The system of claim 9, wherein the detecting that the session between the client application and the application server instance has been terminated comprises determining that a time elapsed since a last request from the client application including the light-weight enqueue session identification was received exceeds a timeout value.

13. The system of claim 9, wherein the detecting that the session between the client application and the application server instance has been terminated comprises receiving notification that a WebSocket connection between the client application and the application server instance has been terminated and also determining that a time elapsed since the WebSocket connection has been terminated and no new WebSocket connection including the light-weight enqueue session identification has been established.

14. The system of claim 13, wherein the application server instance and the enqueue server operate on the same application server.

15. A non-transitory machine-readable storage medium comprising instructions, which when implemented by one or more machines, cause the one or more machines to perform operations comprising:

receiving, from a client application, a request for an enqueue lock for a first piece of data;

creating, by an enqueue server separate from an application server instance, a light-weight enqueue session at the enqueue server for managing lifecycle of enqueue locks, the creating including generating a light-weight enqueue session identification for the light-weight enqueue session;

storing, in the light-weight enqueue session, the enqueue lock for the first piece of data;

sending the light-weight enqueue session identification to the client application;

receiving, from the client application, a request for an enqueue lock for a second piece of data, the request for the enqueue lock for the second piece of data including the light-weight enqueue session identification;

storing, in the light-weight enqueue session, the enqueue lock for the second piece of data;

detecting that a session between the client application and the application server instance has been terminated; and deleting all enqueue locks in the light-weight enqueue session and deleting the light-weight enqueue session in response to the detection that the session between the client application and the application server instance has been terminated.

16. The non-transitory machine-readable storage medium of claim 15, wherein the receiving, from the client application, the request for the enqueue lock for the first piece of data comprises receiving the request for the enqueue lock for the first piece of data via the application server instance.

17. The non-transitory machine-readable storage medium of claim 15, wherein the receiving, from the client application, the request for the enqueue lock for the second piece of data comprises receiving the request for the enqueue lock for the second piece of data via the application server instance.

18. The non-transitory machine-readable storage medium of claim 15, wherein the sending the light-weight enqueue session identification to the client application comprises sending the light-weight enqueue session identification to the client application via the application server.

19. The non-transitory machine-readable storage medium of claim 15, wherein the detecting that the session between the client application and the application server instance has been terminated comprises receiving notification that a WebSocket connection between the client application and the application server instance has been terminated.

20. The non-transitory machine-readable storage medium of claim 15, wherein the detecting that the session between the client application and the application server instance has been terminated comprises determining that a time elapsed since a last request from the client application including the light-weight enqueue session identification was received exceeds a timeout value.

\* \* \* \* \*